Patented Sept. 2, 1947

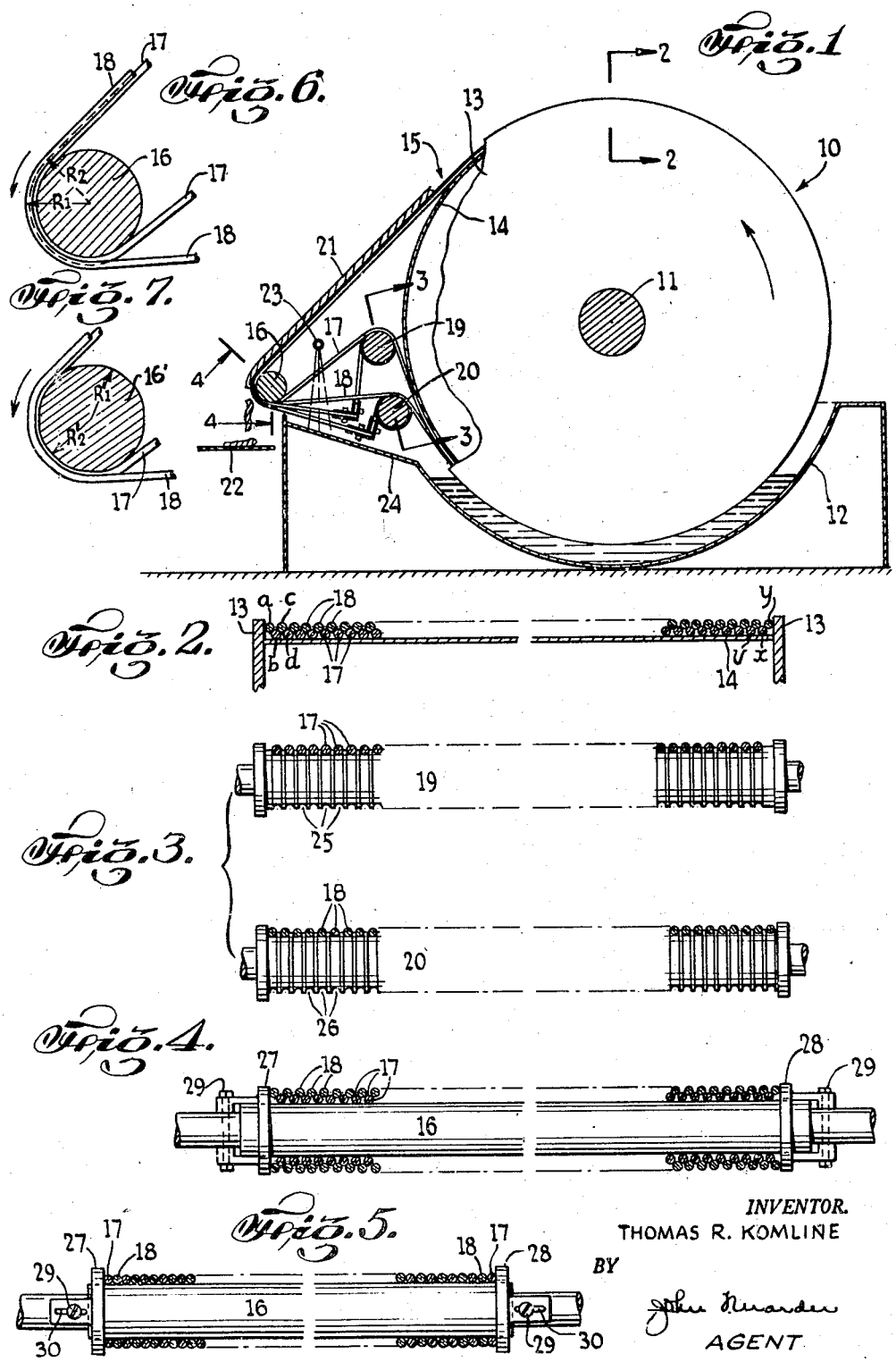

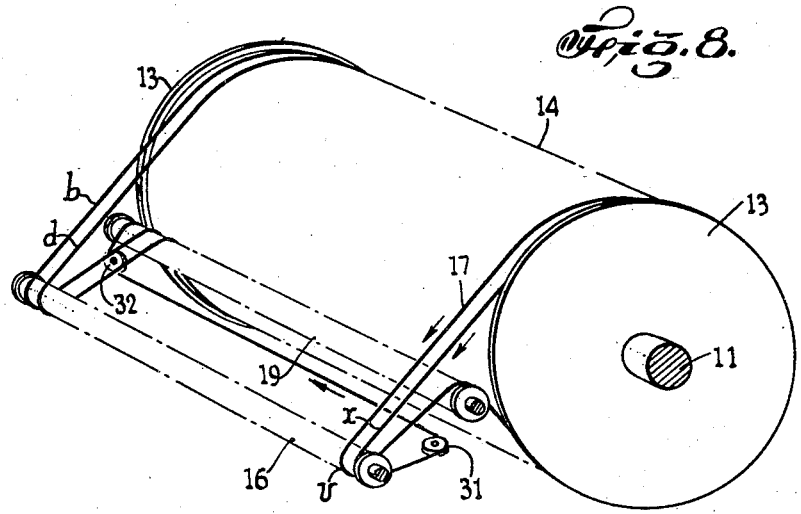
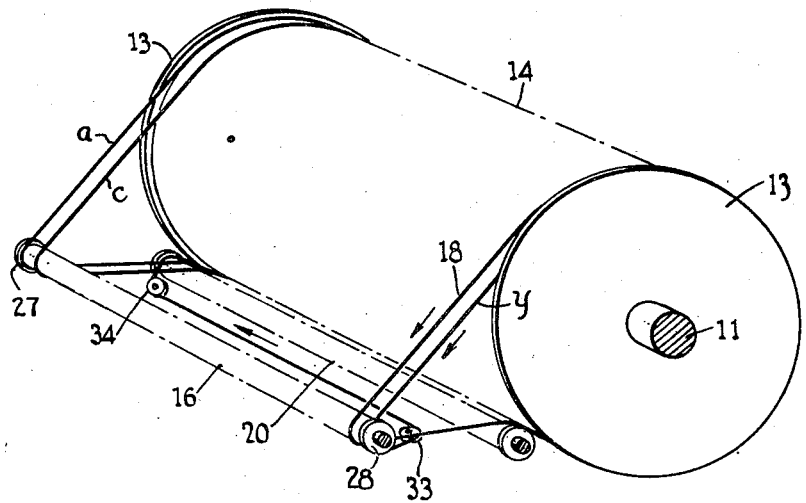

2,426,886

UNITED STATES PATENT OFFICE 2,426,886

CONTINUOUS ROTARY DRUM FILTER

Thomas R. Komline, Glen Rock, N. J., assignor to Komline-Sanderson Engineering Corporation, Ridgewood, N. J., a corporation of New Jersey Application February 1, 1947, Serial No. 725,899

9 Claims. (Cl. 210—199)

This invention relates to continuous rotary drum filters and particularly to filter elements employed with such filters to separate solid material from a suspension in a fluid and to discharge the solids as a filter cake.

Continuous drum filters of the general style to which my invention is applied are used both in the disposal of sewage and in certain manufacturing processes where solids are to be separated from fluids for purposes of disposal or reclamation. The equipment is usually of relatively large size consisting of a drum having a vacuum applied at its surface and rotating partially submerged in the material to be filtered. A filter element or web covers part of the surface of the filter drum and the liquid is drawn through the element by pressure differential, leaving the solids on the surface thereof to be suitably discharged therefrom. Parallel strands of cord in partial overlapping relationship trained over the drum serve particularly well as a filter element or web in the application of drum filters for the reason that fibrous solids do not become entangled with the cords, as is the case with filter webs composed of cloth-like material comprising both a warp and woof. The patent to Wright, No. 2,247,460 shows an example of such a cord filter element wherein the parallel strands of cord complement each other on the drum and are separated after leaving the drum at the line of discharge from the drum to assist in the loosening and ultimate discharge of the cake.

My invention contemplates certain improvements in the formation of cord filter web layers whereby the parallel strands of cord are not separated from one another between the line of discharge of the web from the drum and the discharge roller, the loosening of the cake from the cords being effected by certain adjustable arrangements which are combined with the discharge roller. Subsequent to being trained over the discharge roller as a continuous web, the cords are separated from each other so that they may be properly washed before being retrained about the drum. The washing operation of the cords takes place conveniently at a location where the liquids and solids washed from the cord may be directed back into the tank of liquid being filtered, thus avoiding the necessity for troughs and piping which are required when the products of cord washing are otherwise distributed back into the system.

From the foregoing description it will be seen that an important object of the present invention is to provide a continuous rotary drum filter web of the cord type which may be adjustably arranged to effect efficient cake discharge. A further object of the invention is to provide simple and useful means to dispose of the residual solids which are retained on the web cords after discharge of filter cake.

Other incidental objects and advantages will be apparent from the following description on the physical embodiment of the invention.

In the drawings,

Figure 1 is a diagrammatic side elevation view of a rotary drum filter showing the application of my invention, Figure 2 is a fragmentary section view through the filter drum taken on the lines 2—2 of Figure 1, Figure 3 is a view partly in cross-section of a pair of rollers adjacent to the drum which are used to re-train the cord about the drum, indicated at the lines 3—3 of Figure 1, Figure 4 is a view partly in cross-section of the discharge roller used with my invention, indicated at the lines 4—4 of Figure 1, Figure 5 is a view similar to Figure 4 showing an adjusted position of elements on the discharge roller of Figure 4, Figure 6 is an enlarged cross-section view of the discharge roller shown in Figure 1, Figure 7 is a view similar to that of Figure 6 showing a modified discharge roller, and Figures 8 and 9 are diagrammatic views showing the arrangement of cords trained about the drum and rollers to form the filter web.

Referring to the drawings which are largely diagrammatic, in Figure 1, a drum 10 having trunnions 11 may be suitably supported for rotation above a tank which contains fluid to be filtered. The direction of rotation of drum 10 is counter-clockwise. The fluid material is confined uniformly close to the drum in an arc shaped container 12 so that complete filtration is effected without voids or pockets where solid sludge may accumulate due to currents created by the rotation of the drum. Suitable sectionalized vacuum applying devices are used with the drum, not shown, so that a prescribed pressure differential is maintained over a prescribed portion of the drum surface between the interior and exterior surfaces of the endless cord filter web 15 which is disposed over and across the drum surface 14 intermediate of drum heads 13. Thus, as the drum rotates, solids adhere to the cord filter element 15 while the clarified liquid is carried through suitable piping in the interior of the drum and discharged through outlets associated with the drum trunnions. Timing is such that vacuum is applied to all drum sections located between the line of rotative entrance of any part of the drum into the fluid to the line of discharge of the filter element 15 from the drum.

As the filter element 15 travels off the top of the drum carrying the cake 21 it reaches the rotatably supported discharge roller 16 and, as it reverses direction thereover during drum operation, the filter cake loosens and discharges to a belt conveyor 22, to be suitably carried away. The cord filter element 15 is then separated into two groups of strands 17 and 18, the top group being trained over a suitably trunnioned guide roller 19 and returned to the drum surface. Likewise, the lower group of strands 18 is trained over a guide roller 20 and is returned to the drum surface to complement cords 17, thereby reforming the continuous web element 15 before the section of the rotating drum to which it is applied enters the fluid to be filtered. Spray nozzles 23 located above the separated cords are employed to spray the separated cords with water before they return to the drum, and the accumulation of spray water and residual solids from the cords thus formed drains back to tank 12 on the inclined surface 24.

While the cords are on the drum the consecutive convolutions are spaced as shown in Figure 2, on centers which are slightly less than the diameter of the cords, so that a slight overlapping relationship of cords is maintained entirely across the drum between the confining drum heads 13. Each other convolution becomes a high convolution of cords riding off the drum surface and likewise, between each high convolution is situated a low supporting convolution. On their travel away from the drum and over the smooth surface discharge roller 16, carrying the filter cake 21, the cords are normally disposed in this same overlapping relationship. Figure 4 shows the discharge roller 16 with the cords so arranged and supported laterally by the side guides 27, 28 which are adjustably fixed in position by means of the clamping studs 29. With many types of filter cake, and based on the constituents of the cake, the moisture content and the filter cake thickness, there will be little difficulty in discharging filter cake therefrom as the cords reverse over this discharge roller before being cleaned and re-trained on the drum.

An enlarged cross-section view through discharge roller 16, Figure 6, shows the cord pattern in side elevation and it will be understood at this point that an advantage in discharge is gained where the radius R—1 for the high series of filter cords is slightly larger than the radius R—2 for the low cords giving a differential in the arc of curvature between the high cords and low cords as they are trained over the discharge roller, resulting in a tendency to loosen the cake from the filter element. In instances of filter cake which, because of its peculiarities of make-up is more difficult to discharge, it may be desirable to increase the differential in arcs of curvature of cord strands. This may be done by moving the laterally adjustable side guides 27, 28 slightly closer together, whereby the center distance between adjacent convolutions will be correspondingly decreased.

In other cases of filter cake difficult to discharge it may be desirable to train the cords over the discharge roller 16 with the adjustable side guides 27, 28 spread apart and with the cords of the web all lying directly on the surface of the roller, as shown in Figure 5. The normal weight of the cords plus the filter cake will produce the necessary force for this change without resorting to other web tensioning. This transposition from overlapping relationship on the drum as seen in Figure 2, to non-lapping relationship on the discharge roller as indicated in Figure 5, will result in relative lateral movement between the adjacent cord strands of the filter element and the filter cake and it will increase the tendency for the cake to loosen therefrom and thus, will facilitate discharge. It may also be of some slight advantage to train the cords slightly angularly from the filter drum to the discharge roller in which case the proper adjustments may be made in the side guides 27, 28 on discharge roller 16 to effect such travel.

Modification to enhance discharge may be made in the surface configuration of discharge roller 16 as shown at 16′ in Figure 7. Here, instead of using the usual circular section roller, I have shown as a substitute a flat sided roller which may be substantially octagonal having radius corners R′1 at the intersections of the flat sides R′2. Such a roller will further facilitate loosening the filter cake from the cord web trained thereover due to the sharp changes in radius, and also due to the fluctuations of the web which result as this flattened roller turns. As an equivalent for a flat sided roller, a spider-section construction may also be employed.

Referring again to Figures 1 and 2, the low series of cords 17 in web 15 which I prefer to call drainage cords, after traversing the discharge roller 16 are trained back to the drum over a grooved directioning roller 19, to be then retrained about the drum. The high series of cords 18 which are considered as the filter cords, for differentiation from the drainage cords, are trained about the grooved roller 20 from whence they are retrained about the drum. The low cord set 17 and the high cord set 18 which combine to form web 15 are each wound on the drum and over the various rollers from a single endless cord loop as will be seen in a consideration of Figures 8 and 9 which are diagrammatically descriptive of the arrangement of these two endless loops. Figure 8 shows the low drainage cord loop and Figure 9 is directed to the high filter cord loop.

Referring now to Figure 8 with additional reference to Figure 2 which shows the arrangement of cords forming the web, and following the winding of cord from a point at the top of drum surface 14 on the left hand end of the drum in Figure 8, the first drainage cord $b$ is located in the second web cord position to the right of the left drum head 13. This convolution extends away from the drum, normal to the drum, to the smooth discharge roller 16 continuing thereto in the second web cord position. After being trained over and under roller 16 this convolution is stepped over to the right to the fourth web cord position as the second drainage cord convolution $d$. It is then trained over the grooved guide roller 19 to continue under and over the drum at that position until it again reaches the discharge roller 16 and is again stepped over between the discharge roller and the return to the drum. This winding continues across the drum, the drainage cords representing even positions entirely across the drum to the last even positions $v$ and $x$.

At the right hand end of the drum, instead of being stepped off to the right after traversing discharge roller 16, the cord is threaded over two directional pulleys 31 and 32, and roller 19; and is then re-trained under and over the drum to again become the first drainage cord $b$ at the second web position. Any suitable routine may be established for training the cord on the drum and the cooperating discharge and guide rollers. When it has been so disposed it may then be made endless by joining the starting end and the finishing end to form a complete loop as by vulcanizing the ends together or splicing them or using any other convenient manner of attachment.

Referring now to Figure 9, the windings of the filter cords 18 are intermediate of the drainage cords for the entire width of the drum and between the end drainage cords and the drum heads. Starting with the first filter cord convolution $a$ in the first web cord position at the left hand end of the filter drum abutting the drum head 13, the filter cord path is similar to that of the drainage cords as far as the discharge roller 16. When cord $a$ reaches the discharge roller 16 it is guided against the side guide 27. As it continues over and under the discharge roller 16 it is stepped over to the right, as in the case of the drainage cord windings, to become the third web convolution $c$ as it is trained about the drum and continues as the third web convolution over the drum and down again to the discharge roller. Subsequent convolutions of the filter cord winding are the odd web convolutions entirely across the drum reaching the right hand end of the drum in abutting relationship with the drum head 13 as convolution $y$ and continuing to the discharge roller 16 abutting the side guide 28. After traversing the discharge roller this winding is threaded over the two directional pulleys 33 and 34, to again return to the left hand end of the drum over the guide roller 20 and to be made endless as the first web convolution $a$.

During operation of the filter a continuous web is maintained for purposes of filtration and discharge, and the cords are separated so that they may be conveniently sprayed with water to eliminate any residual cake which may remain thereon after discharge. Normal settings are made in the web pattern at the time of winding the cord elements on the filter, and it is usually unnecessary to make any operating changes either in the disposition of cords or the tension in the web as a whole. In cases of inadequate discharge, the pattern may be adjusted. Should either of the cord loops become tight or loose or broken, it is possible to insert additional cord or cut cords and splice them as required.

It will be understood that changes may be made in the physical embodiment of the invention while adhering to the principles outlined. For instance, drainage cords could be used in the first and last web cord position rather than filter cords although this is not particularly desirable. Also, the adjustment of side guides on the discharge roller may be made operative while the filter is in motion.

I claim:

1. In a vacuum filter, a rotary drum, a discharge roller remotely situated with respect to the drum, a cord strand filter web trained about the drum surface and away from the drum surface to the discharge roller, drum heads projecting beyond the drum surface to restrain the cord web in position on the drum, axially adjustable side guides on the discharge roller to restrain the cord web in position on the roller, and means to separate the cord strands in the filter web and to re-train them on the drum on their return to the drum from the discharge roller.

2. In a vacuum filter, a rotary drum, a discharge roller having a plurality of flat sided surfaces and remotely situated with respect to the drum, a cord strand filter web trained about the drum and away from the drum over the flat sided discharge roller, and means to separate the cord strands in the filter web and to re-train them on the drum during their return to the drum from the discharge roller.

3. In a vacuum filter, a rotary drum, a discharge roller remotely situated with respect to the drum, a pair of endless cords wound about the drum forming a layer of substantially parallel runs of cord on the drum and off the drum over the discharge roller, a pair of directioning rollers situated between the discharge roller and the drum to re-train the cord runs of each endless cord back on the drum, and directioning pulleys over which the cords pass receiving each end run of each endless cord and directing it laterally across the drum to the other end of the drum.

4. In a vacuum filter, a tank for material to be filtered, a rotary drum partially immersed in the tank, a discharge roller remotely situated with respect to the drum, endless cords wound about the drum forming a layer of substantially parallel contiguous runs of cord on the drum and off the drum over the discharge roller, directioning rollers situated between the discharge roller and the drum to re-train the cord runs back on the drum, means to wash the cord runs on their return from the discharge roller to the drum, and means to return the washings to the tank for material to be filtered.

5. In a vacuum filter, a rotary drum, a discharge roller having non-circular cross-section remotely situated with respect to the drum, endless cords wound about the drum forming a layer of substantially parallel contiguous runs of cord on the drum and off the drum over the discharge roller, and directioning rollers situated between the discharge roller and the drum to re-train the cord runs back on the drum.

6. In a vacuum filter, a rotary drum, a discharge roller of non-circular cross-section remotely situated with respect to the drum, a pair of endless cords wound about the drum forming a layer of substantially parallel contiguous runs of cord on the drum and off the drum over the discharge roller, a pair of directioning rollers situated between the discharge roller and the drum to re-train the cord runs of each endless cord back on the drum, and directioning pulleys over which the cords pass receiving each end run of each endless cord and directing it laterally across the drum to the other end of the drum.

7. The method of conveying and discharging filter cake from the web of a rotary drum filter wherein the portion of the web lying on the drum is made up of contiguous overlapping cord strands and the cake is in the form of solids deposited on the cords which includes the step of loosening the cake from the web by training the web from the drum over a discharge roller whereupon the cord strands are in contiguous but non-overlapping relationship.

8. In a vacuum filter, a rotary drum, a discharge roller remotely situated with respect to the drum, endless cords in the form of a web of parallel contiguous cord runs on the drum and off the drum over the discharge roller, means situated between the discharge roller and the drum to separate the runs of cord into layers of parallel non-contiguous cord runs from the discharge roller back to the drum and to re-train the cord runs back on the drum on their return to the drum.

9. In a vacuum filter, a rotary drum, a discharge roller remotely situated with respect to the drum, endless cords wound about the drum forming a web of parallel contiguous runs of cord on the drum and off the drum over the discharge roller, and directioning rollers situated between the discharge roller and the drum to re-train the cord runs back on the drum on their return to the drum from the discharge roller.

THOMAS R. KOMLINE.

REFERENCES CITED

The following references are of record in the file of this patent:

UNITED STATES PATENTS

| Number | Name | Date |
|---|---|---|
| 2,247,460 | Wright | July 1, 1941 |
| 2,371,417 | Wright | Mar. 13, 1945 |
| 2,095,303 | Wright | Oct. 12, 1937 |
| 2,198,912 | Fedeler, Jr. | Apr. 30, 1940 |